US010192238B2

(12) United States Patent
Chatwin et al.

(10) Patent No.: US 10,192,238 B2
(45) Date of Patent: Jan. 29, 2019

(54) REAL-TIME BIDDING AND ADVERTISING CONTENT GENERATION

(71) Applicant: Wal-Mart Stores, Inc., Bentonville, AR (US)

(72) Inventors: Richard Edward Chatwin, Los Altos Hills, CA (US); Murthy V. Nukala, San Mateo, CA (US); Alan Coleman, Lafayette, CA (US); Kiran Garaga Lokeswarappa, Mountain View, CA (US); Srinidhi Ramesh Kondaji, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 751 days.

(21) Appl. No.: 13/725,821

(22) Filed: Dec. 21, 2012

(65) Prior Publication Data

US 2014/0180815 A1    Jun. 26, 2014

(51) Int. Cl.
*G06Q 30/02* (2012.01)

(52) U.S. Cl.
CPC ..... *G06Q 30/0256* (2013.01); *G06Q 30/0275* (2013.01)

(58) Field of Classification Search
CPC .............. G06Q 30/02; G06Q 30/0247; G06Q 30/0255; G06Q 30/0256; G06Q 30/0254; G06Q 30/0269; G06Q 30/0241; G06Q 30/0251; G06Q 30/0261; G06Q 30/0601; G06Q 30/0242; G06Q 30/0257; G06Q 30/0276; G06Q 30/0201; G06Q 30/0244; G06Q 30/0252; G06Q 30/00

USPC ......... 705/14.46, 14.53, 14.52, 14.49, 14.45, 705/14.54, 14.66, 14.72, 14.4, 14.41, 705/14.43, 14.55, 14.73
See application file for complete search history.

(56) References Cited

U.S. PATENT DOCUMENTS

| 6,044,376 A | 3/2000 | Kurtzman, II |
| 6,144,944 A | 11/2000 | Kurtzman, II et al. |
| 6,286,005 B1 | 9/2001 | Cannon |
| 6,421,733 B1 | 7/2002 | Tso et al. |

(Continued)

OTHER PUBLICATIONS

Zheng-Jun Zha, Linjun Yang, Tao Mei, Meng Wang, Zengfu Wang, Tat-Seng Chua, Xian-Sheng Hua, "Visual Query Suggestion: Towards Capturing User Intent in Internet Image Search", ACM Transactions on Multimedia Computing, Communications and Applications, vol. 6, No. 3, Article 13, Publication date: Aug. 2010.*

(Continued)

*Primary Examiner* — David J Stoltenberg
(74) *Attorney, Agent, or Firm* — Bryan Cave Leighton Paisner LLP

(57) ABSTRACT

In one embodiment, a method includes receiving, in real-time, user information associated with a user of a client computing device. One or more user features are derived from the user information associated with the user. The one or more user features include one or more user intents. The one or more user intents are matched with one or more of a plurality of advertiser intents. The user information is determined to be accepted. In response to accepting the user information, an advertisement is generated based on the matching of the one or more user intents and the one or more of the plurality of advertiser intents.

46 Claims, 6 Drawing Sheets

(56) References Cited

U.S. PATENT DOCUMENTS

| | | | |
|---|---|---|---|
| 6,853,982 B2 | 2/2005 | Smith et al. | |
| 7,523,087 B1 | 4/2009 | Agarwal et al. | |
| 7,627,606 B2 | 12/2009 | Barth | |
| 7,689,682 B1 | 3/2010 | Eldering et al. | |
| 7,809,725 B1 | 10/2010 | Vasilik | |
| 7,945,936 B2 | 5/2011 | Yamagishi et al. | |
| 8,166,155 B1 | 4/2012 | Rachmeler et al. | |
| 8,180,760 B1* | 5/2012 | Carver | G06Q 30/0241 707/708 |
| 8,214,264 B2 | 7/2012 | Kasavin et al. | |
| 8,296,643 B1 | 10/2012 | Vasilik | |
| 2003/0149938 A1 | 8/2003 | McElfresh et al. | |
| 2004/0039733 A1 | 2/2004 | Soulanille | |
| 2004/0172332 A1 | 9/2004 | Merriman et al. | |
| 2005/0065806 A1 | 3/2005 | Harik | |
| 2005/0154718 A1 | 7/2005 | Payne et al. | |
| 2005/0267872 A1* | 12/2005 | Galai et al. | 707/3 |
| 2005/0289005 A1 | 12/2005 | Ferber et al. | |
| 2006/0068372 A1 | 3/2006 | Jones, III | |
| 2006/0106710 A1 | 5/2006 | Meek et al. | |
| 2006/0212350 A1 | 9/2006 | Ellis et al. | |
| 2006/0212353 A1 | 9/2006 | Roslov et al. | |
| 2006/0265259 A1 | 11/2006 | Diana et al. | |
| 2006/0271438 A1 | 11/2006 | Shotland et al. | |
| 2006/0282327 A1 | 12/2006 | Neal et al. | |
| 2007/0022006 A1 | 1/2007 | Lynn | |
| 2007/0022011 A1 | 1/2007 | Altberg et al. | |
| 2007/0022442 A1 | 1/2007 | Gil et al. | |
| 2007/0038516 A1 | 2/2007 | Apple et al. | |
| 2007/0094066 A1 | 4/2007 | Kumar et al. | |
| 2007/0150342 A1 | 6/2007 | Law et al. | |
| 2007/0156520 A1 | 7/2007 | Sharma | |
| 2007/0168465 A1 | 7/2007 | Toppenberg et al. | |
| 2007/0198344 A1 | 8/2007 | Collison et al. | |
| 2007/0256029 A1 | 11/2007 | Maxwell | |
| 2008/0046316 A1 | 2/2008 | Shah et al. | |
| 2008/0091526 A1 | 4/2008 | Shoemaker | |
| 2008/0097843 A1 | 4/2008 | Menon et al. | |
| 2008/0114743 A1* | 5/2008 | Venkataraman et al. | 707/3 |
| 2008/0114759 A1* | 5/2008 | Yahia et al. | 707/6 |
| 2008/0128986 A1 | 6/2008 | Morris et al. | |
| 2008/0128991 A1 | 6/2008 | Fisher et al. | |
| 2008/0140521 A1 | 6/2008 | Jambunathan et al. | |
| 2008/0140524 A1 | 6/2008 | Anand et al. | |
| 2008/0183561 A1 | 7/2008 | Zohar et al. | |
| 2008/0189156 A1 | 8/2008 | Voda et al. | |
| 2008/0195483 A1 | 8/2008 | Moore | |
| 2008/0221987 A1 | 9/2008 | Sundaresan et al. | |
| 2008/0243821 A1* | 10/2008 | Delli Santi et al. | 707/5 |
| 2008/0249855 A1 | 10/2008 | Collins et al. | |
| 2008/0262913 A1 | 10/2008 | Reitz et al. | |
| 2008/0275980 A1 | 11/2008 | Hansen | |
| 2008/0294523 A1 | 11/2008 | Little | |
| 2008/0300962 A1 | 12/2008 | Cawston et al. | |
| 2009/0024700 A1 | 1/2009 | Garg et al. | |
| 2009/0037253 A1 | 2/2009 | Davidow et al. | |
| 2009/0063268 A1 | 3/2009 | Burgess et al. | |
| 2009/0063984 A1 | 3/2009 | Agarwal et al. | |
| 2009/0132373 A1 | 5/2009 | Redlich | |
| 2009/0150372 A1 | 6/2009 | Batista Reyes et al. | |
| 2009/0198507 A1 | 8/2009 | Rhodus | |
| 2009/0222550 A1 | 9/2009 | McAfee et al. | |
| 2009/0234711 A1 | 9/2009 | Ramer et al. | |
| 2009/0240674 A1 | 9/2009 | Wilde et al. | |
| 2009/0254643 A1 | 10/2009 | Terheggen et al. | |
| 2009/0299998 A1 | 12/2009 | Kim | |
| 2009/0319517 A1* | 12/2009 | Guha | G06F 17/30864 |
| 2010/0088152 A1 | 4/2010 | Bennett | |
| 2010/0121861 A1 | 5/2010 | Marsden et al. | |
| 2010/0125505 A1 | 5/2010 | Puttaswamy | |
| 2010/0161411 A1* | 6/2010 | Wu | G06Q 30/02 705/14.45 |
| 2010/0191746 A1 | 7/2010 | Wang et al. | |
| 2010/0205180 A1* | 8/2010 | Cooper et al. | 707/740 |
| 2010/0241510 A1 | 9/2010 | Zhang | |
| 2010/0318568 A1* | 12/2010 | Tang et al. | 707/780 |
| 2011/0238608 A1* | 9/2011 | Sathish | G06Q 30/0278 706/47 |
| 2011/0246906 A1 | 10/2011 | Catlin et al. | |
| 2011/0276390 A1* | 11/2011 | Li | G06O 30/02 705/14.42 |
| 2011/0314010 A1* | 12/2011 | Ganti et al. | 707/728 |
| 2012/0047151 A1* | 2/2012 | Leggetter | G06F 17/30646 707/749 |
| 2012/0059713 A1 | 3/2012 | Galas et al. | |
| 2012/0078710 A1* | 3/2012 | Cramer | G06F 17/30867 705/14.43 |
| 2012/0158685 A1* | 6/2012 | White | G06F 17/30867 707/706 |
| 2013/0110627 A1* | 5/2013 | Guha | G06Q 30/02 705/14.54 |
| 2013/0132365 A1* | 5/2013 | Chang | G06O 30/0241 707/710 |
| 2013/0332438 A1* | 12/2013 | Li | G06F 17/30867 707/706 |
| 2014/0046955 A1* | 2/2014 | Dollard | G06Q 30/0251 707/748 |
| 2014/0122228 A1 | 5/2014 | Wical | |
| 2017/0213243 A1* | 7/2017 | Dollard | G06Q 30/0249 |

OTHER PUBLICATIONS

Topic-Sensitive PageRank: A Context-Sensitive Ranking Algorithm for Web Search, Havilewala, Taher H., IEEE Transactions on Knowledge and Data Engineering, vol. 15, No. 4, Jul./Aug. 2003.*
Microsoft Computer Dictionary, Fifth Edition, 2002, Microsoft Press, p. 23.
Mind—A Brief Introduction, John R. Searle, 2004, Oxford University Press, pp. 62-67.
What is Thought, Eric Baum, The MIT Press, 2004, pp. 33-65.
Robotics, Science and Systems III, Wolfram Burgard, Oliver Brock, and Cyrill Stachniss, The MIT Press, 2008, pp. 41-48.
Language and Mind, Chomsky, Oxford University Press, 2005, p. 62.
Computing the Mind, Shimon Edelman, Oxford University Press, 2008, pp. 26-31.
Noetics, Lawrence Krader, 2010, Peter Lang Publishing, pp. 551-553.
Britannica Concise Encyclopedia, Encyclopedia Britannica, 2006, p. 537.
Berthold, Bisociative Knowledge Discovery, 2012, pp. 91-94.
Algorithms + Data Structures = Programs, 1974, pp. xii-55.
Streetlights and Shadows, MIT Press, 2009, pp. 33-47.
Cognition—From Memory to Creativity, Weisberg, Reeves, 2013, John Wiley & Sons, pp. 519-527.
The Way We Think, Fauconnier, 2010, Persues Book Group, Chapter 1, Chapter 13.
Gelderman, Cees J. et al., "Managing the Global Supply Base Through Purchasing Portfolio Management," Journal of Purchasing and Supply Management 12 (2006) pp. 209-217.
Information Storage and Retrieval Systems, Second Edition, Kowalski, Klewer Academic Publishing, 2002, pp. 1-104.
Explaining Creativity, Keith Sawyer, 2006, Oxford University Press, pp. 104-105.

* cited by examiner

REAL-TIME BIDDING AND ADVERTISING CONTENT GENERATION

TECHNICAL FIELD

The present disclosure generally relates to user-specific advertising campaigns, and more specifically to the real-time generation of bids and advertising content.

BACKGROUND

The internet provides a versatile medium for advertising. An advantage of internet advertising over more traditional advertising (such as advertising on billboards or in newspapers or magazines) is more customized or personal advertising, even down to the level of individual users. More personalized advertising tends to be more effective than less personalized advertising, and personalized advertising tends to be more effective when the advertisements are specifically directed at users who are more likely to be interested in the advertisements. Such users are less likely to discard or ignore the advertisements, and as a result the advertisements are more likely to generate revenue. At the same time, more personalized advertising typically reduces advertising costs for advertisers, as the advertisements are usually delivered to fewer users.

Search engine advertisers may show ads to users of search engines on a cost-per-click basis. Advertisers may bid on one or more keywords, including groups of related keywords, which are referred to as advertisement groups. The keywords are pre-selected based on predictions of what terms may be used in queries. Advertisers may select keywords and then assign cost-per-click bids, ad copy, and click-through URLs to each of the keywords or to each of the advertisement groups. Users of the search engine may then enter a query into a search engine (e.g., Google, Yahoo!, Bing) and the search engine may match queries to keywords and display relevant ads to the users, sorting the ads based on cost-per-click bids, click-through rate, and a host of proprietary algorithms.

Advertisers participating in such an auction-based system may face the daunting challenge of managing and optimizing the ongoing bid process, for example, managing and optimizing bids for thousands or millions of keywords or groups of keywords (e.g., advertisement groups). Likewise, generating relevant keywords based on predictions is challenging. Furthermore, proactively writing advertisements that are relevant to particular keywords is difficult. As a result of these difficulties, keyword sets are generally limited, and ad copy is generic in that it does not differ much from keyword to keyword.

SUMMARY OF THE INVENTION

According to embodiments of the present disclosure, disadvantages and problems associated with previous systems and techniques for generating user-specific advertising campaigns may be reduced or eliminated.

In one embodiment, a method includes receiving, in real-time, user information associated with a user of a client computing device. One or more user features are derived from the user information associated with the user. The one or more user features include one or more user intents. The one or more user intents are matched with one or more of a plurality of advertiser intents. The user information is determined to be accepted. In response to accepting the user information, an advertisement is generated based on the matching of the one or more user intents and the one or more of the plurality of advertiser intents.

Particular embodiments of the present disclosure may provide one or more technical advantages. For example, one such advantage may be the generation of advertising content in real-time as user information is received. Specifically, in a particular embodiment, advertising content and real-time bids may be generated in response to user queries that are input through a internet search engine. More specifically, the ad copy displayed to a user may be generated and/or selected based on the terms of the particular user's search query as the query is received. Additionally, the accuracy of matching user intent to advertising intent may be improved. As such, the generated advertisement may be of greater relevance and more positively received by the user.

Another technical advantage may be that the return on investment made by search-engine advertisers may be improved. Specifically, a bid for a particular keyword representing the advertiser's intent may be more accurately generated based on the user's identified intent. As a result, the generated advertisements may result in increased volume of sales and revenue. Another advantage may be that real-time bidding on user queries may allow advertisers to bid higher on "good" queries and lower on "bad" queries. Still another advantage may be that a bid generated in real-time in response to user input may be given a higher position in an auction scenario than another bid. Still other advantages may be that many advertisers utilizing real-time bidding and advertising content generation may experience an initial improvement in their return on investment for their campaigns and choose to reinvest the additional revenue generated or cost savings. Such advertisers may increase the budgets of their search engine marketing campaigns and, thus, further increase their volume of sales and revenue.

Another technical advantage may be improved search engine operations. Because the relevance of the ads displayed to search engine users may be improved, the user experience of the search engine may also be improved. As another technical advantage, real-time bidding on keywords by advertisers may result in more competitive keyword auctions. As a result, advertisers may spend more on keyword bidding, and revenues received by search engine providers may increase. Still another advantage may be that the number of advertising campaign artifacts that must be supported per advertiser may decrease. For example, by shifting some or all of the real-time matching decisions to the advertiser, the search engine can rely on a much reduced set of published campaign artifacts in order to perform its matching operations. The result may be a much more scalable platform, enabling the search engine to expand the set of advertisers and campaigns that it can support.

Certain embodiments of the present disclosure may include some, all, or none of the above advantages. One or more other technical advantages may be readily apparent to those skilled in the art from the figures, descriptions, and claims included herein.

DESCRIPTION OF EXAMPLE EMBODIMENTS

Advertisers may use intent-based marketing campaigns to direct personalized advertisements at users of search engines. Specifically, when a user uses a search engine (e.g., Google, Yahoo!, Bing) to perform search or otherwise inputs some sort of user-specific information, one or more directed advertisements may be placed on the web page that is then displayed to the user. For example, according to previous systems and methods for providing intent-based marketing campaigns, the intent of a user to a web-site or search-engine may be gleaned from the terms within a search query. The user's intents may then be matched to one or more keywords that have been previously selected and bid upon by advertisers. A directed advertisement may then be selected based on the matching of the user's intent to the predefined intents of the advertisers. While such systems provide a degree of intent-based customization, advertisers must predict in advance the search terms that may be entered by a user of the search engine. Additionally, the advertisers must bid in advance on the predicted keywords in order to win the ad placement. Finally, the advertisers must identify specific advertisements that will be displayed in response to the bids that are won on the predicted keywords. However, the performance of any one of these steps as a real-time response to actual search queries received from search engine visitors may improve search campaign performance and result in increased sales from and revenue generated by search-engine-marketing campaigns.

Figure 1:
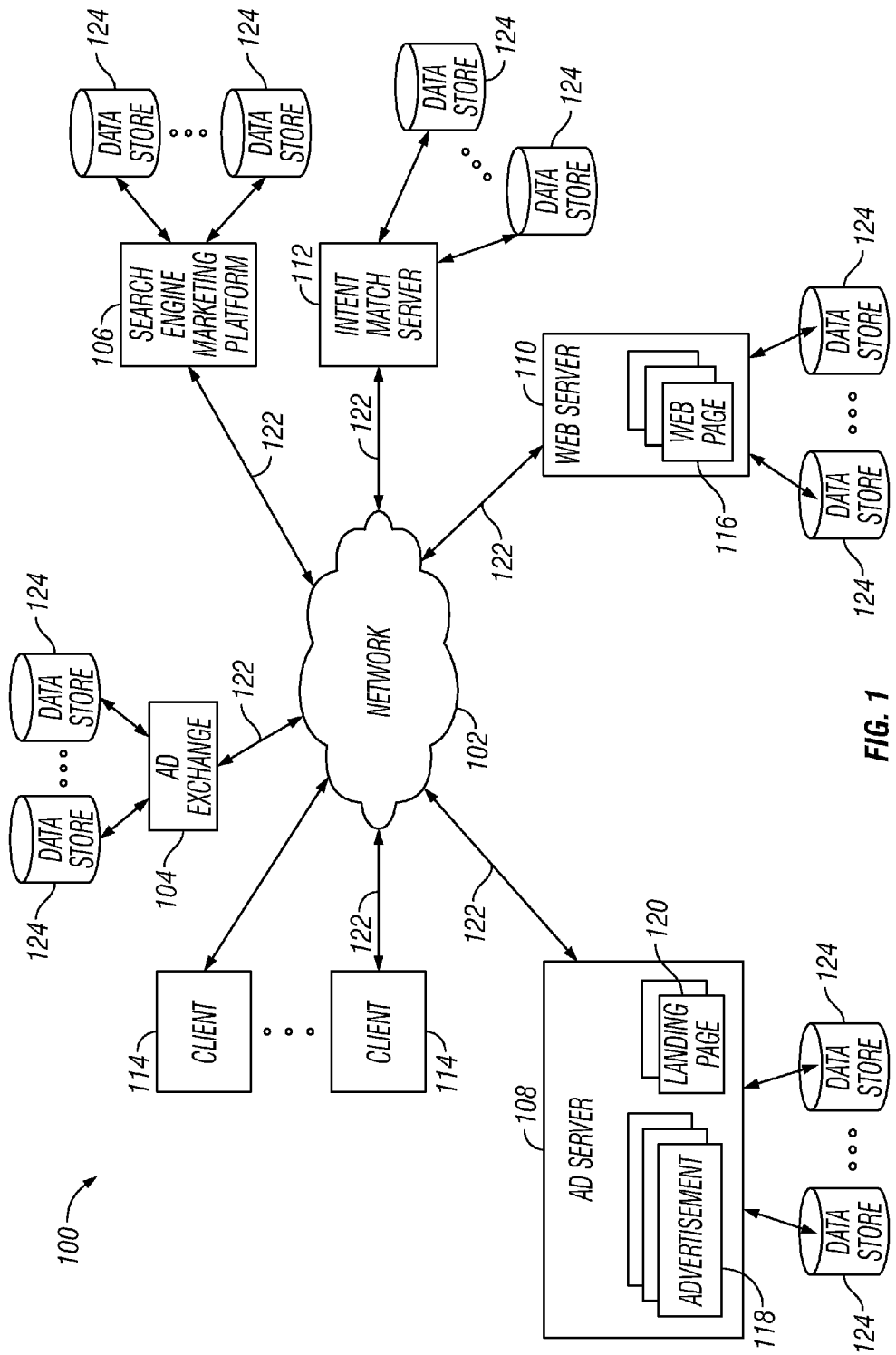
FIG. 1 illustrates an example system for the real-time generation of bids and advertisements in response to received user information.

FIG. 1 illustrates an example system 100 providing for a more user-customized search-engine-marketing campaign in a network environment. In particular embodiments, system 100 may provide for search-time query matching, real-time query bidding, and/or real-time ad generation. System 100 includes a network 102 coupling one or more ad exchanges 104, one or more search engine marketing platforms 106, one or more advertising servers (ad servers) 108, one or more web servers 110, one or more intent match servers 112, and one or more clients 114 to each other. Although not shown, other types of servers may also be included in system 100. For example and without limitation, network 102 may also couple one or more news servers, mail servers, message servers, file servers, application servers, exchange servers, database servers, proxy servers, etc. to each other or to ad exchanges 104, search engine marketing platforms 106, ad servers 108, web servers 110, intent match servers 112, or clients 114. This disclosure contemplates any system 100 in any suitable network environment. As an example and not by way of limitation, although this disclosure describes and illustrates a system 100 that implements a client-server model, this disclosure contemplates one or more portions of a system 100 being peer-to-peer, where appropriate. Particular embodiments may operate in whole or in part in one or more systems 100 and one or more network environments. In particular embodiments, one or more elements of system 100 provide functionality described or illustrated herein. Particular embodiments include one or more portions of system 100.

In particular embodiments, ad exchange 104, client 114, search engine marketing platform 106, ad server 108, web server 110, and intent match server 112 may include one or more network-addressable computing systems that communicate via network 102. This disclosure contemplates any suitable network 102. As an example and not by way of limitation, one or more portions of network 102 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 102 may include one or more networks 102. As will be described in more detail below, ad exchange 104, client 114, search engine marketing platform 106, ad server 108, web server 110, and intent match server 112 may generate, store, receive, and transmit data, such as, for example, user information, search queries, search results, webpages, advertisements, or other suitable data. Ad exchange 104, client 114, search engine marketing platform 106, ad server 108, web server 110, and intent match server 112 may be accessed by the other components illustrated in FIG. 1 either directly or via a suitable network such as network 102.

Links 122 may communicatively couple ad exchange 104, client 114, search engine marketing platform 106, ad server 108, web server 110, and intent match server 112 to network 102 or to each other. This disclosure contemplates any suitable links 122. As an example and not by way of limitation, one or more links 122 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 122. In particular embodiments, one or more links 122 each includes an intranet, an extranet, a VPN, a LAN, a WLAN, a WAN, a MAN, a communications network, a satellite network, a portion of the Internet, or another link or a combination of two or more such links 122. Links 122 need not necessarily be the same throughout system 100. One or more first links 122 may differ in one or more respects from one or more second links 122.

In particular embodiments, one or more data storages 124 may be communicatively linked to one or more severs (e.g., web servers 110 or ad servers 108) via one or more links 122. In particular embodiments, data storages 124 may be used to store various types of information or data. In particular embodiments, a data store 124 may store any suitable information, and the contents of a data store 124 may be organized in any suitable manner. In other embodiments, the data stored in data storages 124 may be organized according to specific data structures. Accordingly, the contents of any one of data stores 124 may be stored as a dimensional, flat, hierarchical, network, object-oriented, relational, XML, or other suitable database or a combination or two or more of these.

Particular embodiments may provide interfaces that enable servers (e.g., web servers 110 or ad servers 108) or clients 114 to manage (e.g., retrieve, modify, add, or delete) the information stored in data storage 124. In particular embodiments, a data store 124 (or an ad server 108, web server 110, ad exchange 104, search engine marketing platform 106, or intent match server 112 coupled to it) may include a database-management system or other hardware or software for managing the contents of data store 124. The database-management system may perform read and write operations, delete or erase data, perform data deduplication, query or search the contents of data store 124, or provide other access to data store 440. In particular embodiments, data storage 124 may have suitable types of database software, such as, for example and without limitation, ORACLE DATABASE, SYBASE SQL SERVER, or MICROSOFT SQL SERVER, which are capable of managing the data stored in data storage 124 and enabling web servers 110, ad servers 108, or clients 114 to access the stored data. The present disclosure contemplates any suitable data storage 124.

There may be multiple parties involved in a search-engine-marketing campaign. Accordingly, in particular embodiments, ad exchange 104, search engine marketing platform 106, ad server 108, web server 110, intent match server 112, and clients 114 may be associated with one or more of the parties involved in the search-engine marketing campaign. For example, clients 114 may be associated with users, visitors, or any persons that access web pages via network 102 and are presented with advertisements. Accordingly, users of clients 114 may be potential customers or potential buyers of the services or products that are the subject of the search-engine marketing campaign.

Although this disclosure contemplates any suitable clients 114, client 114 may include any computing device that enables a user to access or otherwise communicate with network 102, ad server 108, web server 110, ad exchange 104, search engine marketing platform 106, intent match server 112, or another client 114. As an example and not by way of limitation, a client 114 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 114 may be an electronic device including hardware, software, or both for providing the functionality of client 114. As an example and not by way of limitation, a client 114 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 114 may include one or more clients 114; be unitary or distributed; span multiple locations; span multiple machines; span multiple datacenters; or reside in a cloud, which may include one or more cloud components in one or more networks.

A client 114 may enable its user to communicate with other users at other clients 114 or with web server 110. For example, a user at client 114 may enter a Uniform Resource Locator (URL) or other address directing the web browser to web server 110, and the web browser may generate a HTTP request and communicate the HTTP request to web server 110. Web server 110 may be a unitary server or may be a distributed server spanning multiple computers or multiple datacenters. In particular embodiments, web server 110 may include hardware, software, or embedded logic components or a combination of two or more such components for carrying out the appropriate functionalities implemented or supported by web server 110. For example, web server 110 may include a computing device configured to provide web pages 116 for rendering on clients 114. The present disclosure contemplates any suitable webpages 116. As an example, and not by way of limitation, webpages 116 hosted by web server 110 may be static or dynamic.

In particular embodiments, multiple webpages 116 stored together in a common directory at a web server 110 make up a website or a portion of a website. In particular embodiments, a webpage 116 may include one or more elements. As an example and not by way of limitation, the presented (or rendered) elements of a webpage 116 may include static text, static images, animated images, audio, video, interactive text, interactive illustrations, buttons, hyperlinks, or forms. Such elements may each occupy a particular space on the webpage 116 when displayed. Herein, reference to a webpage 116 encompasses one or more corresponding webpage files (which a browser may use to render the webpage) and vice versa, where appropriate. The present disclosure contemplates any suitable webpage files. Herein, reference to a document may encompass a webpage 116, where appropriate. Reference to an element of a webpage 116 may encompass one or more portions of a webpage file for rendering the element, and vice versa, where appropriate.

In particular embodiments, internal (or hidden) elements of a webpage 116 may include, for example and not by way of limitation, comments, meta elements, databases, diagramation and style information. One or more elements of a webpage may be inline frames (IFrames) which enable web developers to embed HTML documents into other HTML documents. Webpages 116 may also include Extensible HyperText Markup Language (XHTML) files, or Extensible Markup Language (XML) files, according to particular needs. Such pages may also execute scripts such as, for example and not by way of limitation, those written in JAVASCRIPT, JAVA, MICROSOFT SILVERLIGHT, combinations of markup language and scripts such as AJAX (Asynchronous JAVASCRIPT and XML), and the like.

One or more elements of a webpage 116 may be advertisements. A position in the webpage 116 where an advertisement is placed may be referred to as an ad space. In particular embodiments, an advertisement has various attributes. As an example and not by way of limitation, attributes of an advertisement may include format (such as text, image, video, audio, animation, gadget, etc.); size; webpage position (such as top, left, above the fold, below the fold, etc.); inclusion method (such as being included in the HTML file for the webpage, being in an IFrame in the HTML file, or being rendered by execution of a script); presentation mode (such as inline, pop-up, pop-under, pre-roll, etc.); destination landing page URL; ad server (such as DOUBLECLICK DART for ADVERTISERS or GOOGLE ADWORDS); expected click-through rate (eCTR); an ad quality score; one or more targeted keywords and/or one or more targeted publishers; and advertiser. Online advertising campaigns (which may encompass multiple advertisements at multiple publishers) may have similar attributes.

An ad server 108 is generally configured to place advertisements or advertising related content in ad spaces. Ad server 108 may be a unitary server or may be a distributed server spanning multiple computers or multiple datacenters for hosting advertisements for inclusion in webpages 116 hosted by web servers 110. Thus, though FIG. 1 depicts system 100 as including a single ad server 108, the present disclosure contemplates any suitable number of ad servers 108. Ad server 108 may include hardware, software, or embedded logic components or a combination of two or more such components for carrying out the appropriate functionalities implemented or supported by ad server 108. Examples of ad serving platforms include, without limitation, DOUBLECLICK DART for PUBLISHERS, or GOOGLE ADSENSE. In a particular embodiment, ad server 108 may be operated by an advertiser that is a sponsor of a search-engine-marketing campaign.

As described above, a webpage 116 rendered by web server 110 may include elements hosted by any combination of web servers 110 and ad servers 108. When a web browser at a client 114 requests a webpage 116, web server 110 may accept the HTTP request and communicate to client 114 one or more HTML files responsive to the HTTP request. The web browser may retrieve and load one or more elements of the webpage 116 from one or more web servers 110, as directed by one or more HTML or other files for rendering the webpage 116. Additionally, the web browser may retrieve and load one or more advertisements placed in the webpage 116 from one or more ad servers 108, similarly as directed by the HTML or other files for rendering the webpage 116. Client 114 may render the webpage 116 based on the HTML files from web server 110 and/or ad server 108 for presentation to the user.

As will be described in greater detail below, an advertiser may target a search-engine-marketing campaign to visitors in general, to specific groups of visitors, or to individual visitors. Generally, the desired outcome of a search-engine-marketing campaign is for many users of clients 114 to purchase the services or products that an advertiser wishes to sell. Specifically, the advertiser may wish to sell one or more particular products, which may include physical products, software products, services, intangible products (such as, for example, intellectual property), other suitable goods or services, or any combination thereof. The advertisements are placed in advertising spaces (or ad spaces) so that they may be presented to the visitors. In the case of search-engine marketing, the ad spaces exist in the digital media, such as the Internet. For example, portions of webpages 116 may be used to present advertisements to people viewing the webpages 116 and these portions of the webpages 116 may be considered ad spaces. Sometimes, an advertiser may have its own ad spaces, but more often the advertiser has too few or does not own any ad spaces. Instead, the advertiser may purchase ad spaces from publishers for placing their advertisements.

In one example, web server 110 may be associated with a publisher, which is a party that owns and sells ad spaces to advertisers and presents the advertisements placed in its ad spaces to visitors on behalf of the advertisers. In anticipation of ad inventory becoming available, an advertiser may submit an advertising order (ad order) to the publisher. An ad order represents an order for placing an advertisement in one or more ad spaces to be presented to one or more visitors. In particular embodiments, an ad order may contain the advertisement to the presented to a visitor and one or more desired features of the ad spaces in which to place the advertisement or one or more desired features of the visitors to whom the advertisement is to be presented. In addition, in particular embodiments, an ad order may also include a default bid price that may be used to bid on the ad inventories for placing the advertisement of the ad order in the ad spaces of the ad inventories.

An advertiser may have specific criteria associated with a search-engine-marketing campaign. The criteria may be reflected in the desired ad-space features and desired visitor features specified for the ad orders so that each ad order may target specific time, locations, consumers/users, etc. The desired features may be general or specific. As an example and not by way of limitation, the desired visitor features may include demographical information concerning the visitors, visitors having particular behavioral patterns, etc. The desired ad-space features may include where and when the ad space is presented, who owns the ad space, what event causes the ad space to become available, etc.

In particular embodiments, the advertiser may wish to place its advertisements in webpages corresponding to a specific search query (e.g., webpage containing the search result identified for a specific search query). Accordingly, the ad order may specify the search query as another one of its desired ad-space features (e.g., ad space contained in webpages corresponding to the search query). In a particular embodiment, for example, an advertiser's ad order may include one or more keywords that the advertiser has indicated as being potentially relevant to the products or services that the advertiser is attempting to sell. The ad order may also include a default bid (typically on a cost-per-click basis) on the one or more keywords or one or more groups of keywords. The ad order may also assign a default ad copy to each keyword or group of keywords. To improve conversion, the advertiser will typically attempt to make the text ads 118 as relevant as possible to all the keywords in the ad group.

Additionally, an order may assign a click-through URL or landing page 120 to the ad copy 118 or to the keyword or group of keywords. A landing page 120 is a webpage that is presented to a visitor when the visitor clicks on the displayed advertisement 118. The landing page 120 usually contains content that is a logical extension of the associated advertisement. For example, if the advertisement is about a television, the associated landing page may contain a detailed description or specification of the television, various images of the television, user reviews of the television, unit price, shipping cost, or applicable tax for purchasing the television. The visitor may obtain further information and purchase the television via the landing page 120. To improve conversion, the advertiser may attempt to make the landing page 120 as relevant as possible to one or more keywords and to the ad copy 108 displayed to or clicked on by the user.

In particular embodiments, the specific advertisements 118 and landing pages 120 to be displayed to a user of client 114 may be selected based upon the terms of the specific search query or other information entered by a user of client 114. Accordingly, one or more of ad server 108, web server 110, ad exchange 104, or search engine marketing platform 106 may each include one or more search engines. A search engine may include hardware, software, or both for providing the functionality of search engine. As an example and not by way of limitation, a search engine may implement one or more search algorithms to identify network resources in response to search queries received at search engine, one or more ranking algorithms to rank identified network resources, or one or more summarization algorithms to summarize identified network resources. In particular embodiments, a ranking algorithm implemented by a search engine may use a machine-learned ranking formula, which the ranking algorithm may obtain automatically from a set of training data constructed from pairs of search queries and selected Uniform Resource Locators (URLs), where appropriate.

In particular embodiments, when web server 110 receives a search query or other user information, web server 110 may attempt to match one or more terms in the search query with one or more keywords for which a default bid has been placed by an advertiser. In other embodiments, ad exchange 104 may perform the matching of the one or more terms to default bids placed by advertisers. In still other embodiments, web server 110 may communicate with a search engine marketing platform 106, which may reside or be implemented on one or more servers (e.g., application servers) and may be operated by a broker on behalf of or representing one or more advertisers or by an advertiser. Search engine marketing platform 106 may be implemented as hardware, software, or embedded logic components or a combination of two or more such components. In particular embodiments, search engine marketing platform 106 may be capable of carrying out appropriate functionalities such as selecting ad inventories, determining default bidding amounts, constructing customized advertisements and landing pages for individual visitors, analyzing visitor responses, etc. based on query search terms.

It may be generally recognized that advertisers may face challenges in managing ad inventories and placing appropriate ad orders containing default bids. As an example and not by way of limitation, an advertiser may have difficulty anticipating possible search engine queries and selecting appropriate keywords on which to place default bids. Users can enter nearly any query into a search engine, which means that the list of keywords a marketer can bid on may be enormous. However, in practice, there may be limits on the number of keywords on which advertisers can bid. Advertisers may not have the capacity to manage such enormous numbers of keywords. Furthermore, search publishers may set limits on the number of keywords an advertiser can have in its account; and not all keywords will be relevant or profitable for a given advertiser. Given the vast number of potential keywords, it may be a challenge for advertisers to systematically anticipate and select keywords that will achieve their marketing objectives, such as, for example, driving the highest volume and quality of clicks with the least amount of cost.

In particular embodiments, an advertiser may use intent match server 112 to generate real-time bids in response to actual search queries or other received user information. Intent match server 112 may be a unitary server or may be a distributed server spanning multiple computers or multiple datacenters for analyzing webpage requests as they are received, placing real-time bids on advertising spaces within webpages, and identifying specific advertisements for inclusion in webpage renderings. Intent match server 112 may include hardware, software, or embedded logic components or a combination of two or more such components for carrying out the appropriate functionalities implemented or supported by intent match server 112. In particular embodiments, intent match server 112 may be operated by an advertiser. In other embodiments, intent match server 112 may be operated by a group of advertisers or by a broker who represents the advertiser or group of advertisers. Alternatively, in other embodiments, intent match server 112 may be operated by a search engine provider or by a group of search engine providers or by a broker who represents the search engine provider or group of search engine providers. As will be described in more detail below, an advertiser may use intent match server 112 to refine default bids and produce real-time bids in response to actual search queries. Intent match server 112 may also operate to generate advertisements and landing pages that are more relevant to a specific query than the advertisements 118 and landing pages 120 that are associated with default bids in pre-packaged ad orders.

Figure 2:
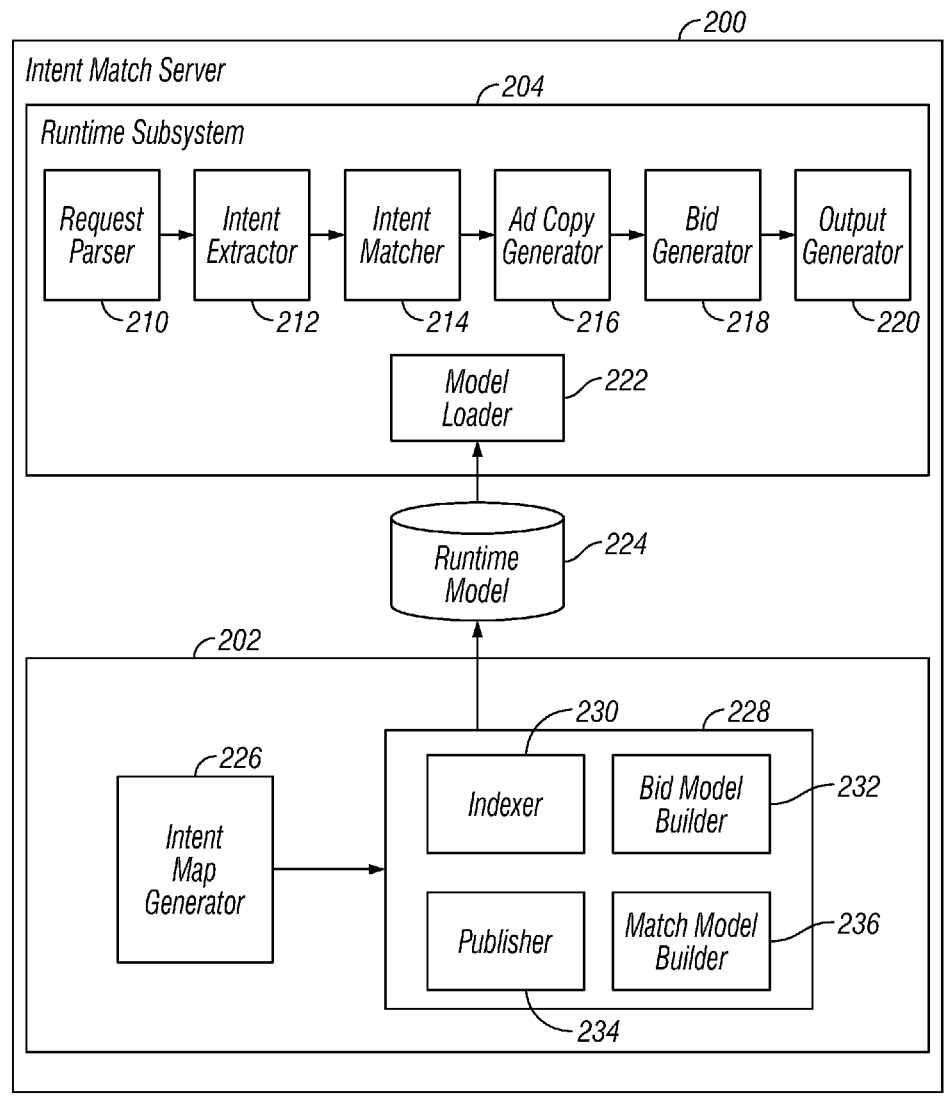
FIG. 2 illustrates an example intent match server providing for the real-time generation of bids and advertisements in response to received user information.

FIG. 2 illustrates an example intent match server 200, according to one example embodiment. As depicted, intent match server 200 includes two major subsystems: a campaign management subsystem 202 and an intent match runtime subsystem 204. In particular embodiments, intent match server 200 is a high-volume, low-latency request processing server. In order to achieve these goals, each subsystem 202 and 204 may maintain a lightweight runtime footprint. Accordingly, each subsystem 202 and 204 may perform as little processing as possible for each request, creating the minimum number of temporary objects possible, and using data structures that allow the server to run in a compact and close-to-fixed amount of memory overall. Though intent match server 200 is depicted as having two subsystems, it is recognized that intent match server 200 may include fewer or more subsystems in other embodiments. Further, though one or more functional components may be described as being associated with a particular one the subsystems, it is also recognized that the functional components may be associated with any one of the depicted subsystems or with additional or alternative subsystems that are not depicted.

Intent Match Runtime Subsystem

Intent match runtime subsystem 204 is responsible for run-time processing and generation of run-time data for improved query bidding. In the depicted embodiment, intent match runtime subsystem 204 includes one or more processing modules that may be collectively thought of as a processing pipeline. For example, intent match runtime subsystem 204 may lend itself to a context-based pipeline design, analogous to servlet filters associated with Java. In particular embodiments, all information may flow through intent match runtime subsystem 204 on a context object. Instead of accepting various named parameters and returning various types, each processing module of the intent match pipeline accepts an intent match context object as its input, and returns that same object as its return value, in particular embodiments. Interface contracts (enforced by automated tests) ensure that each processing module of the pipeline is permitted to change only the context fields of the context object for which the particular processing module is responsible. This may allow easy addition of new processing modules to the pipeline and each processing module to change which context information is read without causing changes to the overall pipeline.

In particular embodiments, intent match runtime subsystem 204 is able to handle a very high volume of requests in a predictable way at extremely low latency. These constraints may impact the design of each processing module within intent match runtime subsystem 204 but also place demands on the framework in which the request-processing code executes. Given the volume and latency requirements, the framework of intent match runtime subsystem 204 may be as lean as possible while still remaining robust and manageable. One example candidate providing for a lightweight intent match runtime subsystem 204 is the Netty asynchronous server framework. However, it is generally recognized that other server frameworks may be used to meet the objectives of intent match runtime subsystem 204.

As depicted, intent match runtime subsystem 204 includes a request parser processing module 210, intent extractor processing module 212, an intent matcher processing module 214, an adcopy generator processing module 216, a bid generator processing module 218, and an output generator processing module 220. The functions and objectives of each processing module will be discussed below.

Request Parser Processing Module

Request parser processing module 210 receives a raw request from web server 110 or another component of system 100. In particular embodiments, request parser 210 may operate to unpack the raw request, construct a context object, and populate the context object with the input parameters provided by the request. Request parser 210 may be one of the few processing modules within intent match runtime subsystem 204 that produces or consumes any data other than the context object. Accordingly, the processing of input data may be isolated from the processing of the other processing modules associated with intent match runtime subsystem 204.

Intent Extractor Processing Module

Intent extractor processing module 212 receives the context object from request parser processing module 210 and performs query processing and intent extraction on the object. In this phase, the raw query and any additional data provided by the web server 110 are parsed and one or more user features may be extracted. In certain embodiments, user features may include user intent, semantic features, and/or purchase funnel pattern features. In a particular embodiment, for example, intent extractor 212 may read the input query from the context object and populate a list of topic: term pairs in the intent match context as its output. If publishers of available ad space provide additional metadata, the metadata may also be included in the context object, and intent extractor 212 may perform intent processing on such metadata. In operation, intent extractor 212 uses the topics and terms from an intent graph index to perform intent extraction. The intent graph index will be described in more detail below.

Intent extractor 212 may also use keyword template information and other search campaign data to enhance its extraction capabilities. A keyword template may comprise one or more intent topics and may be formed based on an intent graph, which is described in more detail below with regard to FIG. 3. A keyword template may be constructed using keywords, expressions, placeholders or variable names (such as, for example, intent topics, intents, or key intents) from parts of the intent map. This may be done in a partially- or fully-automated manner using the intent graph and various data sources. Data sources may include, for example, keyword lists, query logs, product catalogs, guided navigation facets, historical performance data from marketing campaigns, website content, other suitable data sources, or two or more such sources. In particular embodiments, a keyword template may be constructed based at least in part on a collection of known keywords. Additionally or alternatively, a keyword template may be constructed based at least in part on the historical performance of particular keywords and/or the intents associated with particular segments of particular keywords.

Intent Matcher Processing Module

Intent matcher processing module 214 identifies whether the query should be accepted or rejected. In particular embodiments, an intent graph index may be used to match the user intents extracted from the query to one or more advertiser intents associated with the products or services offered by the advertiser. In other embodiments, the query may be rejected where the matches do not meet a minimum requirement of relevance. For example, if intent extractor 212 derives no intents from the user query, then intent matcher 214 may simply reject the query. As another less obvious example, if intent extractor 212 derives no intent from the user query that is related to a service or product offered by an advertiser, intent mater 214 may also reject the query. Where a determination is made to reject the query, the intent match runtime subsystem 204 may not proceed with any further processing of the query. At this point the output generator 220 may be called directly to formulate an appropriate communication to the web server 110 indicating that no ad should be displayed to the user in response to the query on behalf of the advertiser.

In particular embodiments, intent matcher 214 may read the list of topic:term pairs in the context object provided by intent extractor 212. Intent matcher 214 may then set a Boolean value in the context object which indicates acceptance or rejection of the user query. Like intent extractor 212, intent matcher 214 may use the topics and intents stored in the intent graph index to perform its operations. Additionally, intent matcher 214 may optionally use keyword template information (or some transformed version of keyword information) to enhance its matching capabilities. It is generally recognized that any matching algorithm may be used by intent matcher 214.

The intent matcher 214 may use one or more of a set of matching strategies to determine whether to accept or reject the query. For example, the intent matcher 214 may accept the query if every token in the query is either an intent stored in the intent graph index or a stop word. As a second example, the intent matcher 214 may accept the query if the query intents identified by the intent extractor 212 are a super-set of a set of intents derived from a keyword template. As a third example, the intent matcher 214 may accept the query if the set of query intents identified by the intent extractor 212 contains an intent from the "Product" topic in the intent graph index. As a fourth example, the intent matcher 214 may accept the query if the set of query intents identified by the intent extractor 212 contains an intent from the "Product" topic in the intent graph index and does not contain a negative intent from the intent graph index.

In particular embodiments, the intent matcher 214 may use the match model included in the runtime model 224 to determine whether to accept or reject the query. As described below, in particular embodiments, the match model may utilize one or more data types as features in a classification model. The one or more data types may include: user intents extracted from the query by the intent extractor; semantic features extracted from the query by the intent extractor, such as the "head noun" of the query; or purchase funnel pattern features extracted from the query by the intent extractor. The match model may include a weight for each different feature. The match model may additionally include a threshold. In certain embodiments, the intent matcher 214 may use the match model to compute a score for a query. The score may be computed by summing the weights of all the features that are identified as being present in the query. In certain embodiments, the intent matcher 214 may accept a query if its score exceeds the threshold and reject the query otherwise. In other embodiments, the intent matcher 214 may accept a query if its score is greater than or equal to the threshold and reject the query otherwise.

Ad Copy Generator Processing Module

Where intent matcher 214, marks a context object as being accepted, the context object may be passed to ad copy generator processing module 216. Ad copy generator 216 may then generate an actual ad for the user query. In particular embodiments, ad copy generator 216 utilizes heuristics (a set of rules) to select the most appropriate available ad template for the set of input intents received from intent matcher 214. By using an ad template, an ad may be customized to provide relevant ad copy for each product of an advertiser. An advertiser may leverage an intent map to develop relevant ad copy in a scalable manner. As an example and not by way of limitation, an ad template may have the ad attributes <title>, <description 1>, <description 2>. If the ad template is for furniture on sale, the ad template may be:

| Ad Attributes | Ad Template | Example Ad |
|---|---|---|
| Title | Great deals on <furniture+> | Great deals on couches |

| Ad Attributes | Ad Template | Example Ad |
|---|---|---|
| Description 1 | <call to action> the perfect <furniture> for your home. On sale today! | Buy the perfect couch for your home. On sale today! |
| Description 2 | Just $50 for shipping! | Just $50 for shipping! |

The example ad template contains the intent topics <furniture> and <call to action>. The "+" in the <furniture+> intent topic indicates using the plural of the intent, which may be used to achieve grammatical correctness in the ad copy. Other syntax may be used in the ad templates in order to achieve ad copy that meets length restrictions that may be imposed by a publisher. As an example and not by way of limitation, the use of "{ }" indicates that the text or intent topic in the braces is optional and the use of "[|]" indicates that one of the options in the brackets should be chosen. Because various intents may be of various character lengths, these syntaxes may be used to provide alternative or optional text or intent topics so that ad copy templates may produce ad copy that does not violate a publisher's length restrictions.

In certain embodiments, ad copy generator 216 may populate the ad template to create the final ad. For example, ad copy generator 216 may read the list of topic:term pairs provided in the context object and then populate the title, description, and display url of the ad. In some embodiments, ad copy generator 216 may also populate the destination url, which may be static or dynamic, in the context object. Ad copy generator 216 uses the ad templates provided in the intent graph index but may need little or nothing else to generate the final ad copy.

Bid Generator Processing Module

As depicted, bid generator processing module 218 receives the context object from ad copy generator 216. However, it is generally recognized that bid generator 218 may read the outputs of any our processing module from the context object. In operation, bid generator applies an bidding model and inserts a bid value in the context object. Specifically, bid generator 218 may calculate an appropriate bid for the generated ad based on the query, the existing bid, and/or additional campaign performance data. Any suitable bid management system may be used to generate the bid. However, in particular embodiments, bid management system is configurable to leverage the context data that provides valuable insight as to the expected user response to the ad copy in terms of click, conversion, and revenue generated.

Output Generator Processing Module

Output generator processing module 220 receives the context object from bid generator 218. Output generator 220 retrieves the data from the context object and converts the data to a format that may be processed by the search engine marketing platform 106 or the web server 110. If the data in the context object indicates that the query should be rejected, the output generator 220 creates a payload for communication to the search engine marketing platform 106 that indicates that the advertiser does not wish to be included in the auction for displaying ads in response to the query. The output generator 220 will not communicate a generated ad copy or generated bid to the search engine marketing platform 106 and the payload will indicate that the default ad copy and the default bid should not be entered into the auction for displaying ads in response to the query. Alternatively, if the data in the context object indicates that the query should be accepted, the output generator will create a payload for communication to the search engine marketing platform 106 that indicates that the advertiser does wish to be included in the auction for displaying ads in response to the query. The payload may indicate that the default ad or the default bid should be entered into the auction. Alternatively, the payload may include a generated ad copy or a generated bid and will indicate to the search engine marketing platform 106 that one or both of these should be utilized in place of the default ad or default bid in the auction. If the data from the context object indicates that a generated ad copy should be utilized, the output generator 220 may convert the data from the context object to a format that may be used by web server 110 in the generation of the code to form a web page 116 that includes the generated ad copy.

Intent Match Runtime Model Loader

Certain of the described processing modules of intent match runtime subsystem 204 are described above as using data while performing the various operations on the context object. For example, intent extractor 212 uses the topics and terms from an intent graph index to perform intent extraction. As another example, ad copy generator 216 uses ad templates to generate an ad copy that is relevant to the intents identified by the intent extractor 212 and the intent matcher 214. As still another example, bid generator 218 applies a bidding model to determine a bid value for the context object. The data used by these and the other processing modules may be obtained from a model loader 222 of intent match runtime subsystem 204. Accordingly, in particular embodiments, model loader 222 may be loaded with one or more intent graphs, ad templates, and/or bid models for use by the processing modules. In other embodiments, model loader 222 may detect new or updated data and automatically upload the data without interrupting the operations of the processing modules 210-220. As will be described in more detail below, such data may be stored in a structured file called a runtime model 224 that is provided to model loader 222 by one or more components of campaign management subsystem 202.

Campaign Management Subsystem

Campaign management subsystem 202 comprises an offline portion of intent match server 200. Campaign management subsystem 202 may be responsible for generating the data to be uploaded to or extracted by runtime model loader 222. In particular embodiments, for example, campaign management subsystem 202 may generate a structured file that includes the information needed for run-time processing of the processing modules within intent match runtime subsystem 204. As described above, the file may be called the runtime model 224, and it may include one or more intent graphs, keyword templates, ad templates, match models, bid models, and related data.

In the depicted embodiment, campaign management subsystem 202 includes an intent graph generator 226 and a runtime model generator 228. Runtime model generator includes an intent graph indexer processing module 230, model builder processing module 232, and a runtime model publisher processing module 234. It is generally recognized, however, that this is merely one exemplary embodiment. Campaign management subsystem 202 may include any appropriate number of processing modules and the operations of each module described below may be combined in any suitable manner.

Intent Graph Generator Processing Module

The intent graph generator processing module 226 may be the primary tool for building and managing real-time intent matched bids and ad campaigns. In particular embodiments, the intent graph generator 226 may operate to generate an intent graph, which may be associated with a particular category of products or services offered by an advertiser.

Figure 3:
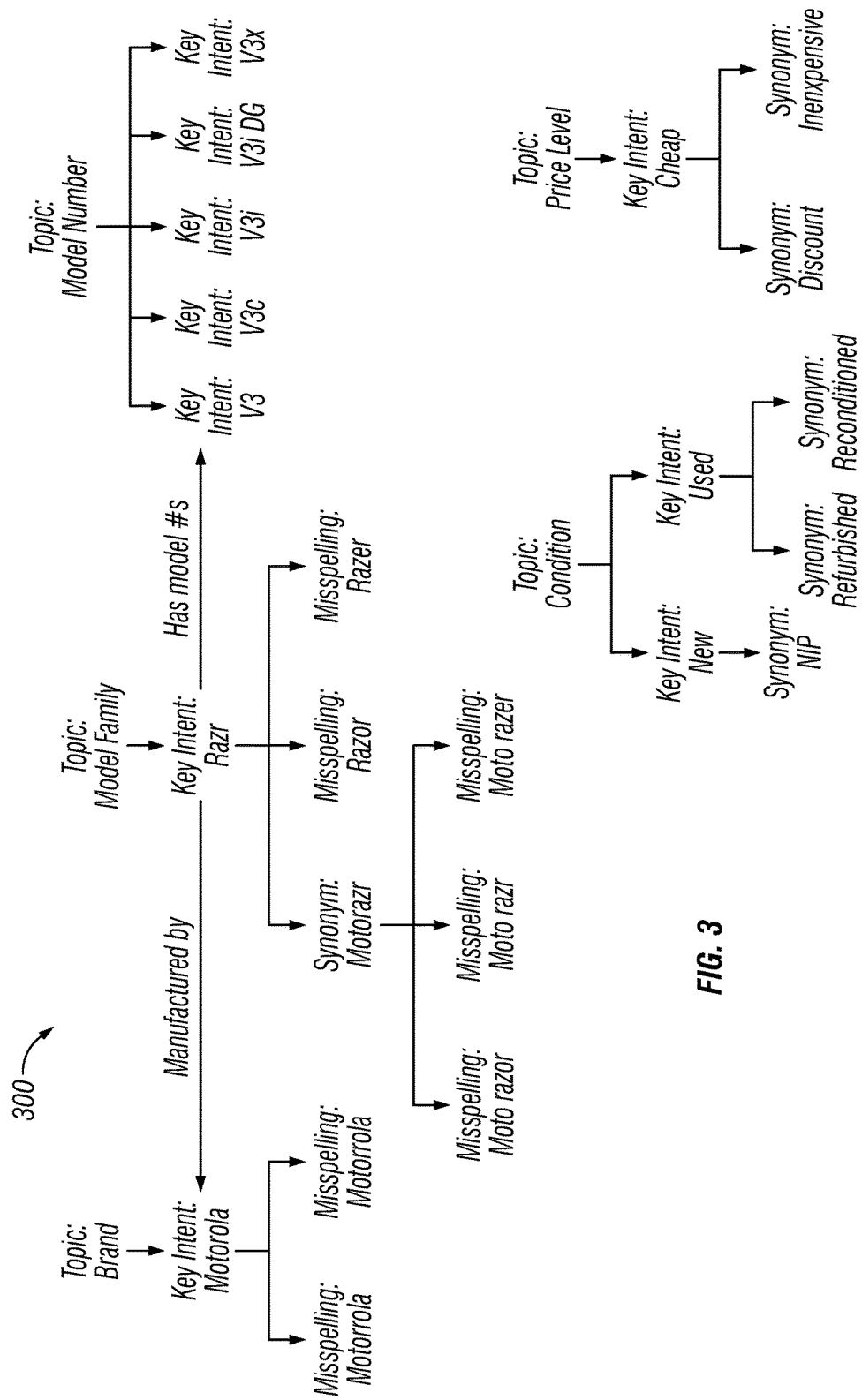
FIG. 3 illustrates an example intent graph.

FIG. 3 illustrates an example intent graph 300 that is associated with the mobile phone category. Intent graph 300 has five intent topics: <brand>, <model family>, <model number>, <condition>, and <price level>. The intent topic <brand> includes the key intent <brand=Motorola>. The key intent <brand=Motorola> may match with the user intent "Motorola," or with user intents representing misspellings of that key intent, such as "Motorrola" or "Motorolla." The intent topic <model family> includes the key intent <model family=Razr>, where a "Razr" is a brand of cell phone manufactured by the company Motorola. The key intent <model family=Razr> may match with the user intent "Razr," or with user intents that represent misspellings of that key intent, such as "Razor" or "Razer." Similarly, the key intent <model family=Razr> may match with the keyword "Motorazr," which is a synonym of "Razr," and that synonym may match with misspellings of the synonym, such as "Moto razor," "Moto razr," or "Moto razer." The intent topic <model number> includes the key intents <model number=V3, V3c, V3i, V3i DG, V3x>. The key intents <brand=Motorola> and <model family=Ran> are related to each other, where the former key intent has the relationship of "manufactured by" with respect to the latter key intent. Furthermore, the key intents <brand=Motorola> and <model number=V3, V3c, V3i, V3i DG, V3x> are related to each other, where the former key intent has the relationship of "has model numbers" with respect to the latter key intents. The intent graph also includes the intent topics <condition> and <price level>. The intent topic <condition> contains the key intents <condition=new> and <condition=used>. The key intent <condition=new> may match with the user intent "new" or with the synonym "NIB." The key intent <condition=used> may match with the user intent "used" or with the synonyms "refurbished" or "reconditioned." Finally, the intent topic <price level> includes the key intent <cheap>, which may match with the user intent "cheap" or with user intents that represent synonyms of that user intent, such as "discount" or "inexpensive." Although this disclosure describes a particular intent graph with particular elements, this disclosure contemplates any suitable intent graphs with any suitable elements. For example, although this disclosure describes particular intent topics, this disclosure contemplates intent graphs with any suitable intent topics.

As described above, intent graph 300 or an indexed version of intent graph 300 may be used by a web server 110, ad exchange 104, search engine marketing platform 106 to match default bids with available ad space to answer anticipated search queries by users of clients 114. Accordingly, and as was described with regard to FIG. 1, intent graph generator 226 may generate intent graphs 300 that may be transmitted to one or more of web server 110, ad server 108, ad exchange 104, and/or search engine marketing platform 106. Additionally, intent graphs 300 may be loaded into runtime model 224 and stored on intent match server 112 or intent match server 200 for use in generating real-time ads or bids in response to actual search queries received by users of clients 114. In particular embodiments, intent mapgraph generator 226 may push the intent graphs to runtime model generator 228 for generation of the runtime model file 224.

Intent Graph Indexer

Intent graph indexer module 230 generates the metadata lookup structures needed by processing modules 210-220 of intent match runtime subsystem 204 of intent match server 200. The lookup structures may include an intent graph index that is a quickly-navigable and memory-efficient representation of an intent graph. The intent match index may serve two purposes. First, the intent match index may aid in the quick matching and/or extraction of intents that appear in a user query. Second, the intent match index may aid in the lookup of allowed and relevant ad copy templates for a set of intents.

In particular embodiments, the intent graph index is a specialized representation of the topics and intents of an intent graph (such as intent graph 300). The lookup structures may also include a similarly tuned representation of the ad copy templates for generating relevant ad copy for a particular intent graph. The lookup structures may also include an indexed representation of one or more keyword templates as well if used in performing intent extraction and intent matching. The lookup structures may include any other additional data that may be used by processing modules 210-220. In a particular embodiment, each portion of the intent graph index (i.e., index, ad copy templates, and keyword templates) should be independent of one another such that any changes to one portion affects only the particular processing modules 210-220 that use the changed portion.

Match Model Builder Processing Module

Match model builder processing module 236 uses the intent graph index and other data to create a classification model for a particular intent graph (that may represent a given advertiser and category). The match model may contain persistent structures that may be leveraged by the intent matcher 214 to determine whether a given query is "commercial" for the advertiser and category represented by the intent graph. Queries deemed commercial for the advertiser and category by the intent matcher 214 may be accepted, while those classified as not commercial for the advertiser and category by the intent matcher 214 may be rejected. The structure of the match model may be compact and promote efficient real-time computation.

The match model may be structured such that it may be updated independently of the other data contained in the runtime model 224. The match model may be updated periodically as query data is obtained to better improve the matching process. For example, the match model may be updated at least daily. In particular embodiments, match model builder 236 may run more frequently than intent graph indexer 230. As a result, the match model may also be published more frequently than the intent graph index.

The match model builder may utilize several different data types as features in the classification model. For example, the match model builder may use the user intents extracted from the query by the intent extractor. User intents may be positive or negative intents. For example, suppose an advertiser's campaign is focused on the category "Women's dresses". The query "red dress shoes" should not be matched to the advertiser's campaign. Accordingly, "shoe" may be included as a negative intent in the intent graph. A negative intent will be a feature in the classification model and will have a negative weight.

As a further example, the match model may include semantic features such as the "head noun" of the query. Understanding the presence or absence of such semantic features in the query can help to identify the user's true intent. For example, the query "gas grills" has head noun "grills" and is commercial for an advertiser campaign in the "barbeque grills" category. However, the query "gas grill dangers" has head noun "dangers" and is not commercial for this advertiser. The query "batman rises dvd" has head noun: "dvd" and is commercial for an advertiser campaign in the "movie dvd" category, but the query "batman rises cast" has head noun "cast" and is not commercial for this advertiser.

As an additional example, the match model may include purchase funnel pattern features, which may indicate the stage of purchase funnel the user is in, and hence how likely the user is to make a purchase. For example, search query patterns for users in Product-Research Stage may look like "buy <product>", "<product> reviews", "how to buy <product>". By contrast, the search query patterns for users that are close to the Purchase Stage may include "where to buy <product>", "<product> deals", etc. Finally, the search query patterns for users in the Post-Purchase/Support-Guide Stage may include "how to use <product>, <product> not working" patterns. Whereas the queries in the Product-Research Stage and Purchase Stage are commercial, queries in the Post-Purchase stage are typically non-commercial.

The match model may be trained in a semi-supervised fashion in an offline mode based on the query features described above. Because most queries are succinct and short, the performance of the match model may be improved by utilizing a query alias in place of the query for identifying some or all of the query features to be entered into the training phase of the classification model. For example, the top K snippets from the organic listings on the Search Engine Result Page (SERP) of the query may be used as the query alias.

Bid Model Builder Processing Module

Bid model builder processing module 232 uses campaign performance and other data to create a bid recommendation model for a particular intent graph. The bid model may contain the persistent structures needed by bid generator 218. The structure of the bid model may be compact and efficient to minimize the amount of memory and processing resources required to generate bids at query-time.

The bid model may be structured such that it may be updated independently of the other data contained in the runtime model 224. The bid model may be updated periodically as performance data is obtained to better improve the bid generation process. For example, the bid model may be updated at least daily. In particular embodiments, bid model builder 232 may run more frequently than intent graph indexer 230. As a result, the bid model may also be published more frequently than the intent graph index.

Runtime Model Publisher Processing Module

Runtime model publisher 234 transfers the completed intent match runtime file 224 to intent match runtime subsystem 204 so that model loader 222 can load the runtime model file 224 and start using it. As described above, the runtime file 224 may include the intent graph index, the match model, and the bid model. Alternatively, the intent graph index, the match model, and the bid model may comprise two or more files. In particular embodiments, the runtime model has a clearly partitioned and extensible structure such that relatively simple changes may be made to the file without requiring extensive code changes.

Although this disclosure describes and illustrates particular components of the systems illustrated in FIGS. 1 and 2, this disclosure contemplates that any suitable combination of any suitable components for carrying out the described functions. Additionally, it is contemplated that the various modifications may be made to the components described and to the functions performed by the components. For example, though the systems are described as being used for the real-time generation of bids and advertisements in the context of responding to search engine queries, it is recognized that the systems described herein can be used for the generation of real-time advertisements in any online setting.

Accordingly, the components described with regard to FIGS. 1 and 2 may be modified to respond to any user input or any action by a user.

Figure 4A:
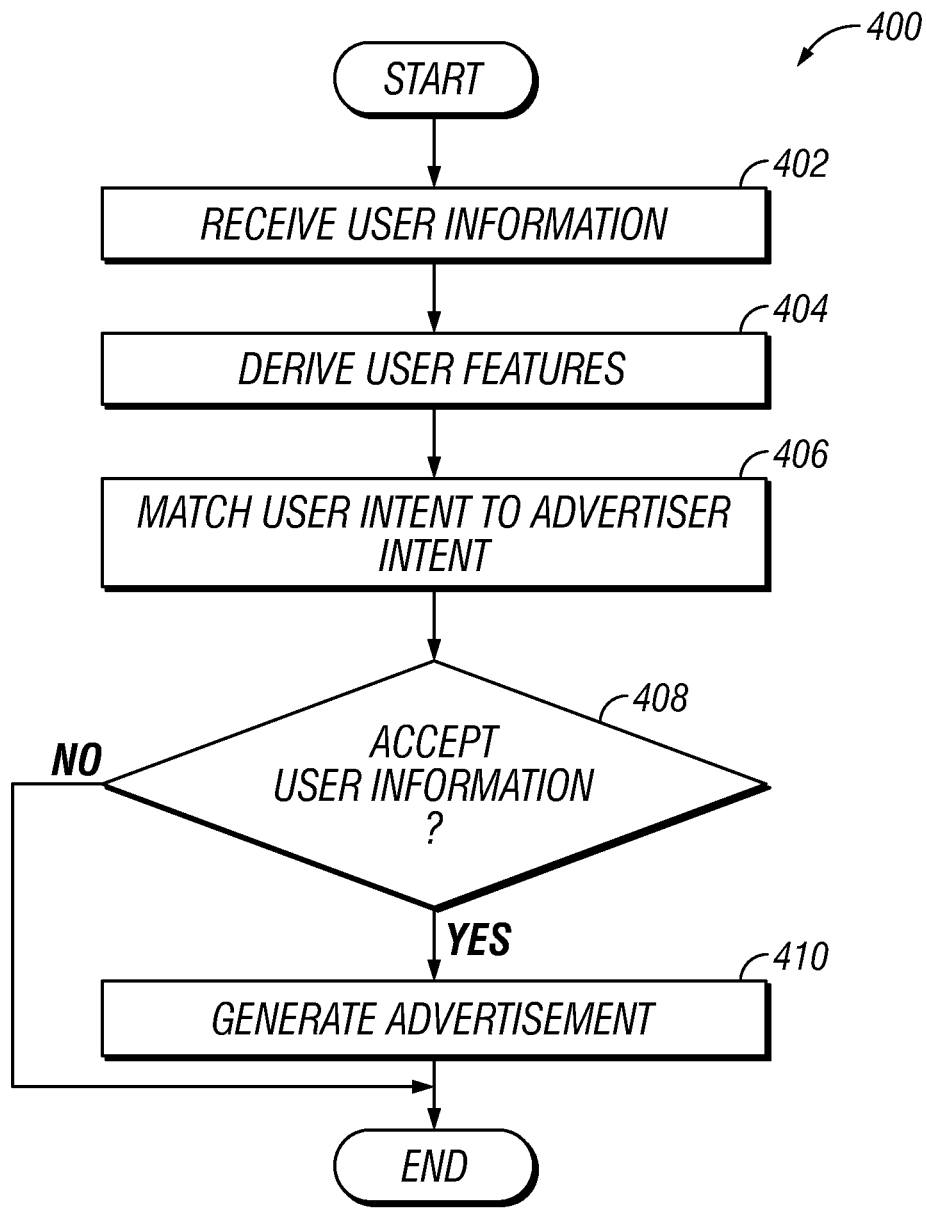
FIGS. 4A and 4B illustrate methods for the real-time generation of bids and advertisements in response to received user information.
Figure 4B:
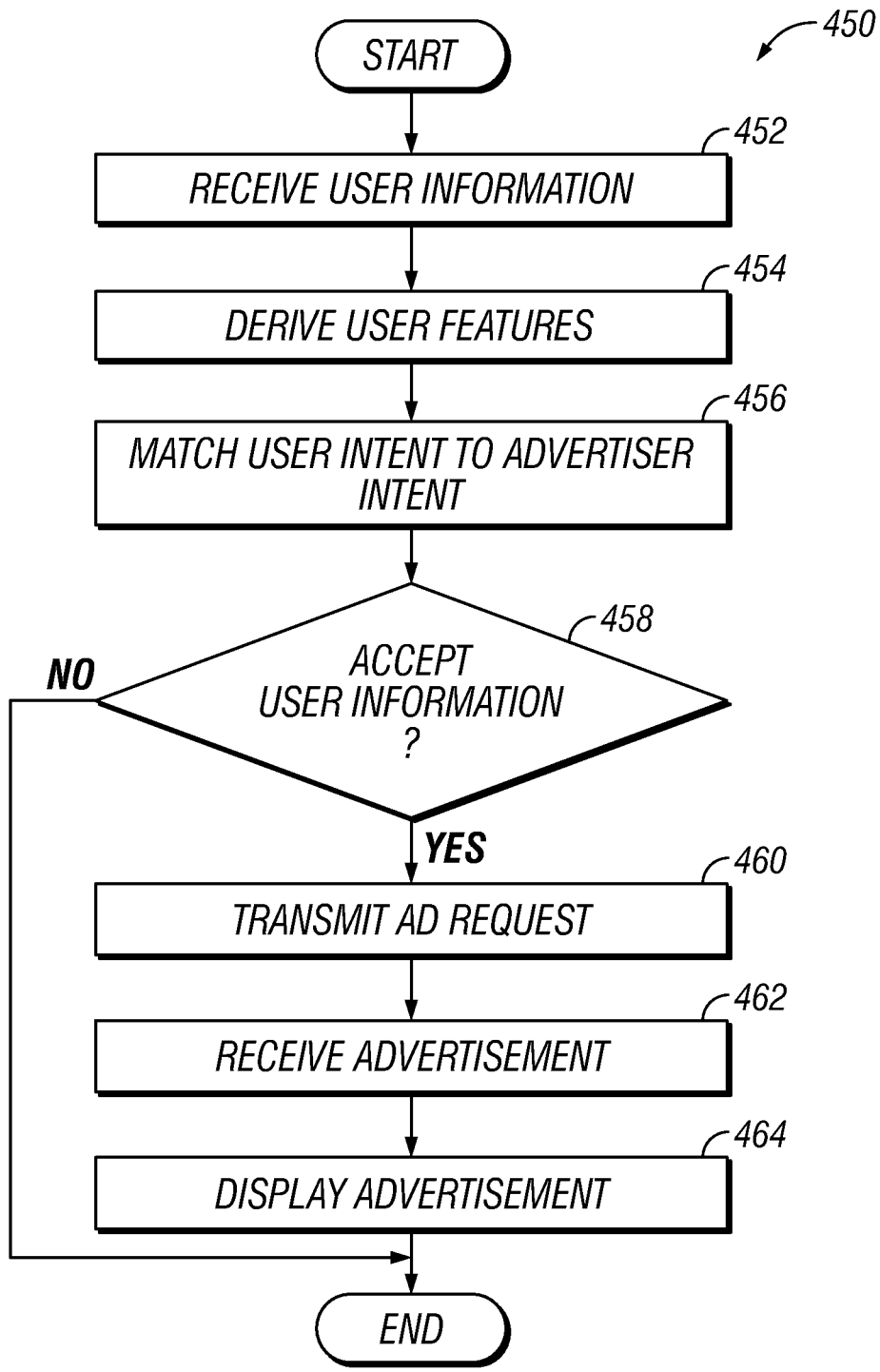

FIGS. 4A and 4B illustrate methods for providing a more user-customized advertising campaign. Specifically, FIG. 4A illustrates a method 400 for the real-time generation of bids and advertisements in response to received user information. The method begins at step 402 when user information is received. In particular embodiments, the user information may include a search query entered by a user of an internet search engine. In another embodiment, the user information may include one or more online activities of the user. At step 404, one or more user features may be derived from the user information. For example, in one particular embodiment, one or more user intents may be derived from the user query or other information. In one particular embodiment, when the user information includes a search query, the search query may be parsed to determine the presence of one or more sets of words. The user intents may be derived based on the one or more sets of words in the search query. The user intents may then be matched to one or more advertiser intents at step 406.

The method continues at step 408 where it is determined whether the user information is accepted or rejected. In one particular embodiment, the user information may be accepted if every one of the one or more sets of words in the search engine query matches at least one of the plurality of advertiser intents. In another embodiment, the user information may be accepted if it is determined that the any one of the user intents matches any one of the advertiser intents. In still another embodiment, the user information may be accepted if every one of the user intents matches at least one of the advertiser intents. In another embodiment still, the user information may be accepted if a similarity score between the user features and the advertiser intents exceeds a predefined threshold.

If the user information is not accepted, the method terminates. Conversely, if the user information is accepted, the method continues to step 410 with the generation of an advertisement. In certain embodiments, the advertisement may be accompanied by or form a portion of a bid that is generated based on the user features and the matching of the user intents to the advertiser intents.

FIG. 4B illustrates a method 450 for receiving and displaying advertisements generated in real-time as responsive to user queries or other user information. The method begins at step 452 when user information is received. In particular embodiments, the user information may include a search query entered by a user of an internet search engine. In another embodiment, the user information may include one or more online activities of the user. At step 454, one or more user features may be derived from the user information. For example, in one particular embodiment, user intents may be derived from the user query or other information. In one particular embodiment, the search engine query may be parsed to determine the presence of one or more sets of words. The user intents may be derived based on the one or more sets of words in the search engine query. The user intents may then be matched to one or more advertiser intents at step 456.

The method continues at step 458 where it is determined whether the user information is accepted or rejected. In one particular embodiment, the user information may be accepted if every one of the one or more sets of words in the search engine query matches at least one of the plurality of advertiser intents. In another embodiment, the user information may be accepted if it is determined that the any one of the user intents matches any one of the advertiser intents. In still another embodiment, the user information may be accepted if every one of the user intents matches at least one of the advertiser intents. In another embodiment still, the user information may be accepted if a similarity score between the user features and the advertiser intents exceeds a predefined threshold.

If the user information is not accepted, the method terminates. Conversely, if the user information is accepted, the method continues to step 460 when an ad request is transmitted to the advertiser. The advertisement may be received at step 462. In certain embodiments, the advertisement may be generated based on the user features and the matching of the user intents to the advertiser intents. As was described above, in certain embodiments, the advertisement may be accompanied by or form a portion of a bid that identifies a maximum amount that the advertiser is willing to pay to have the advertisement displayed to the user. The advertisement may be displayed to the user at step 464 after which the method may terminate.

Although this disclosure describes and illustrates particular steps of the methods of FIGS. 4A and 4B as occurring in a particular order, this disclosure contemplates any suitable steps of the method of FIGS. 4A and 4B occurring in any suitable order. Additionally, although this disclosure describes and illustrates particular components carrying out particular steps of the method of FIGS. 4A and 4B, this disclosure contemplates any suitable combination of any suitable components carrying out any suitable steps of the method of FIGS. 4A and 4B.

Figure 5:
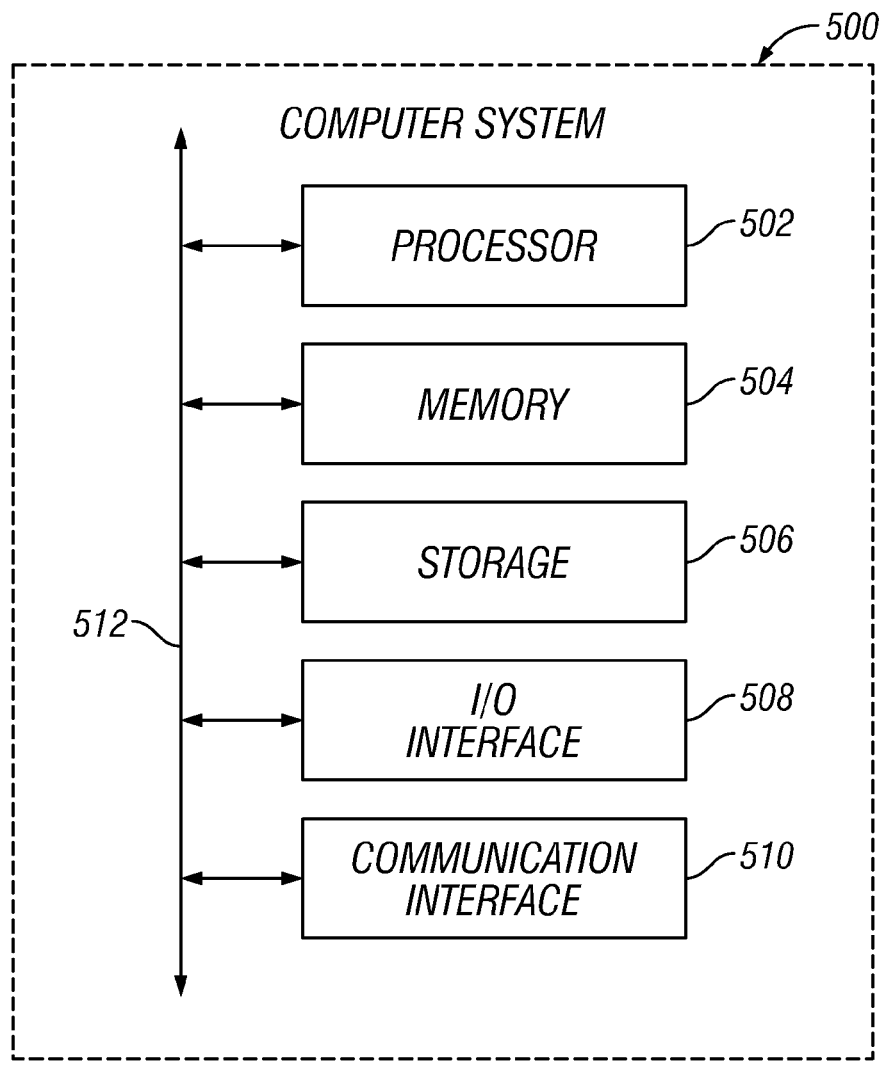
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an", or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of generating a personalized Internet advertisement, the method comprising:

receiving, by one or more server computing devices and in real-time, user information associated with a user of a client computing device;

deriving one or more user features from the user information associated with the user, the one or more user features comprising one or more user intents;

generating, by the one or more server computing devices, one or more intent graphs relative to the user and an advertiser having a plurality of advertiser intents;

matching, by the one or more server computing devices, using the one or more intent graphs, the one or more user intents with one or more of the plurality of advertiser intents associated with products or services offered by the advertiser, wherein matching the one or more user intents with the one or more of the plurality of advertiser intents comprises:

accepting, at an intent matcher processing subsystem of the one or more server computing devices, one or more intent match context objects, wherein the one or more intent match context objects comprise a list of topic-term pairs as output, each of the one or more intent match context objects are associated with at least one of the one or more user intents, the one or more intent match context objects are accepted as input and returned as output at each of a plurality of processing subsystems of a processing pipeline of the one or more server computing devices implementing an intent match runtime system, the plurality of processing subsystems comprising the intent matcher processing subsystem, and each respective processing subsystem of the plurality of processing subsystems is configured to change only a context field of a context object of the one or more intent match context objects corresponding to a responsibility of the each respective processing subsystem;

computing, by the one or more server computing devices, and using one or more statistical models, a similarity score between the one or more user features and the one or more of the plurality of advertiser intents;

determining, by the one or more server computing devices, that the user information is accepted, including determining that the similarity score exceeds a threshold; and in response to accepting the user information, generating, by the one or more server computing devices, the personalized Internet advertisement based on the matching of the one or more user intents and the one or more of the plurality of advertiser intents.

2. The method of claim 1, wherein receiving the user information associated with the user comprises receiving a search engine query of the user.

3. The method of claim 2, further comprising:

parsing the search engine query submitted by the user to determine a presence of one or more sets of words; and deriving the one or more user intents based on the one or more sets of words in the search engine query.

4. The method of claim 3, wherein determining that the user information is accepted comprises determining that every one of the one or more sets of words in the search engine query matches at least one of the plurality of advertiser intents.

5. The method of claim 1, wherein:
the user information comprises one or more present online activities of the user; and
deriving the one or more user features further comprises:
determining the one or more user features based on the one or more present online activities of the user.

6. The method of claim 1, wherein determining that the user information is accepted comprises determining that every one of the one or more user intents matches at least one of the plurality of advertiser intents.

7. The method of claim 1, wherein determining that the user information is accepted comprises:
determining that at least one of the one or more user intents matches at least one of a first specified subset of the plurality of advertiser intents; and
determining that every one of the one or more user intents does not match any one of a second specified subset of the plurality of advertiser intents.

8. The method of claim 1, further comprising:
deriving a plurality of keywords from the plurality of advertiser intents,
wherein determining that the user information is accepted comprises determining that one or more of the plurality of keywords matches with the one or more user intents.

9. The method of claim 1, further comprising:
generating, by the one or more server computing devices, a bid based on the one or more user features and the matching of the one or more user intents and the one or more of the plurality of advertiser intents,
wherein the bid comprises a maximum payment amount that an advertiser placing the bid agrees to pay if the bid is selected.

10. The method of claim 9, wherein the bid further comprises the personalized Internet advertisement.

11. A method comprising:
receiving, by one or more server computing devices and in real-time, user information associated with a user of a client computing device;
deriving one or more user features from the user information associated with the user, the one or more user features comprising one or more user intents;
generating, by the one or more server computing devices, one or more advertiser intent graphs, the one or more advertiser intent graphs comprising a plurality of advertiser intents;
matching, by the one or more server computing devices, using the one or more advertiser intent graphs, the one or more user intents with one or more of the plurality of advertiser intents, wherein matching the one or more user intents with the one or more of the plurality of advertiser intents comprises:
accepting, at an intent matcher processing subsystem of the one or more server computing devices, one or more intent match context objects, wherein the one or more intent match context objects comprise a list of topic-term pairs as output, each of the one or more intent match context objects are associated with at least one of the one or more user intents, the one or more intent match context objects are accepted as input and returned as output at each of a plurality of processing subsystems of a processing pipeline of the one or more server computing devices implementing an intent match runtime system, the plurality of processing subsystems comprising the intent matcher processing subsystem, and each respective processing subsystem of the plurality of processing subsystems is configured to change only a context field of a context object of the one or more intent match context objects corresponding to a responsibility of the each respective processing subsystem;
computing, by the one or more server computing devices and using one or more statistical models, a similarity score between the one or more user features and the one or more of the plurality of advertiser intents;
determining, by the one or more server computing devices, that the user information is accepted;
in response to accepting the user information, transmitting a request for an advertisement to an advertiser associated with the one or more of the plurality of advertiser intents;
receiving the advertisement from the advertiser associated with the one or more of the plurality of advertiser intents; and
displaying the advertisement received from the advertiser to the user.

12. The method of claim 11, wherein receiving the user information associated with the user comprises receiving a search engine query of the user.

13. The method of claim 12, further comprising:
parsing the search engine query submitted by the user to determine a presence of one or more sets of words; and
deriving the one or more user intents based on the one or more sets of words in the search engine query.

14. The method of claim 13, wherein determining that the user information is accepted comprises determining that every one of the one or more sets of words in the search engine query matches at least one of the plurality of advertiser intents.

15. The method of claim 11, wherein:
the user information comprises one or more present online activities of the user; and
deriving the one or more user features further comprises:
determining the one or more user features based on the one or more present online activities of the user.

16. The method of claim 11, wherein determining that the user information is accepted comprises determining that the one or more user intents match the one or more of the plurality of advertiser intents.

17. The method of claim 11, wherein determining that the user information is accepted comprises determining that every one of the one or more user intents matches at least one of the plurality of advertiser intents.

18. The method of claim 11, wherein determining that the user information is accepted comprises:
determining that at least one of the one or more user intents matches at least one of a first specified subset of the plurality of advertiser intents; and
determining that every one of the one or more user intents does not match any one of a second specified subset of the plurality of advertiser intents.

19. The method of claim 11, wherein further comprising:
deriving a plurality of keywords from the plurality of advertiser intents, and
wherein determining that the user information is accepted comprises determining that one or more of the plurality of keywords matches with the one or more user intents.

20. The method of claim 11, wherein determining that the user information is accepted comprises determining that the similarity score exceeds a threshold.

21. The method of claim 11, further comprising:
receiving one or more bids for the search engine query, wherein a bid of the one or more bids comprises a maximum payment amount that an advertiser placing the bid agrees to pay if the bid is selected.

22. The method of claim 21, wherein the bid further comprises the advertisement.

23. A system comprising:
a memory comprising instructions; and
one or more processors coupled to the memory and operable to execute the instructions to:
receive, in real-time, user information associated with a user of a client computing device;
derive one or more user features from the user information associated with the user, the one or more user features comprising one or more user intents;
generate, by one or more server computing devices, one or more intent graphs;
match, using the one or more intent graphs, the one or more user intents with one or more of a plurality of advertiser intents for generating advertising bids by:
accepting, at an intent matcher processing subsystem of the one or more server computing devices, one or more intent match context objects, wherein the one or more intent match context objects comprise a list of topic-term pairs as output, each of the one or more intent match context objects are associated with at least one of the one or more user intents, the one or more intent match context objects are accepted as input and returned as output at each of a plurality of processing subsystems of a processing pipeline of the one or more server computing devices implementing an intent match runtime system, the plurality of processing subsystems comprising the intent matcher processing subsystem, and each respective processing subsystem of the plurality of processing subsystems is configured to change only a context field of a context object of the one or more intent match context objects corresponding to a responsibility of the each respective processing subsystem;
determine that the user information is accepted including determining that a similarity score exceeds a threshold; and
in response to accepting the user information, generate an advertisement based on the matching of the one or more user intents and the one or more of the plurality of advertiser intents.

24. The system of claim 23, wherein, when the one or more processors are operable to execute the instructions to receive the user information associated with the user, the one or more processors are further operable to execute the instructions to receive a search engine query of the user.

25. The system of claim 24, wherein the one or more processors are further operable to execute the instructions to:
parse the search engine query submitted by the user to determine a presence of one or more sets of words; and
derive the one or more user intents based on the one or more sets of words in the search engine query.

26. The system of claim 25, wherein, when the one or more processors are operable to execute the instructions to determine that the user information is accepted, the one or more processors are further operable to execute the instructions to determine that every one of the one or more sets of words in the search engine query matches at least one of the plurality of advertiser intents.

27. The system of claim 23, wherein the user information comprises one or more present online activities of the user and the one or more processors are further operable to:
determine the one or more user features based on the one or more present online activities of the user.

28. The system of claim 23, wherein, when the one or more processors are operable to execute the instructions to determine that the user information is accepted, the one or more processors are further operable to execute the instructions to determine that every one of the one or more user intents matches at least one of the plurality of advertiser intents.

29. The system of claim 23, wherein, when the one or more processors are operable to execute the instructions to determine that the user information is accepted, the one or more processors are further operable to execute the instructions to:
determine that at least one of the one or more user intents matches at least one of a first specified subset of the plurality of advertiser intents; and
determine that every one of the one or more user intents does not match any one of a second specified subset of the plurality of advertiser intents.

30. The system of claim 23, wherein the one or more processors are further operable to execute the instructions to:
derive a plurality of keywords from the plurality of advertiser intents, and
determine that one or more of the plurality of keywords matches with the one or more user intents when determining that the user information is accepted.

31. The system of claim 23, wherein the one or more processors are further operable to execute the instructions to:
use one or more statistical models to compute the similarity score and the similarity score is between the one or more user features and the one or more of the plurality of advertiser intents.

32. The system of claim 23, wherein the one or more processors are further operable to execute the instructions to:
generate a bid based on the one or more user features and the matching of the one or more user intents and the one or more of the plurality of advertiser intents, the bid comprising a maximum payment amount that an advertiser placing the bid agrees to pay if the bid is selected.

33. The system of claim 32, wherein the bid further comprises the advertisement.

34. A system comprising:
a memory comprising instructions; and
one or more processors coupled to the memory and operable to execute the instructions to:
receive, in real-time, user information associated with a user of a client computing device;
derive one or more user features from the user information associated with the user, the one or more user features comprising one or more user intents;
match, using one or more intent graphs, the one or more user intents with one or more of a plurality of advertiser intents by:
accepting, at an intent matcher processing subsystem of one or more server computer devices, one or more intent match context objects, wherein the one or more intent match context objects comprise a list of topic-term pairs as output, each of the one or more intent match context objects are associated with at least one of the one or more user intents, the one or more intent match context objects are accepted as input and returned as output at each of a plurality of processing subsystems of a processing pipeline of the one or more server computer devices implementing an intent match runtime system, the plurality of processing subsystems comprising the intent matcher processing subsystem, and each respective processing subsystem of the plurality of processing subsystems is configured to change only a context field of a context object of the one or more intent match context objects corresponding to a responsibility of the each respective processing subsystem;

use one or more statistical models to compute a similarity score between the one or more user features and the one or more of the plurality of advertiser intents;

determine that the user information is accepted including determining that the similarity score exceeds a threshold;

in response to accepting the user information, transmit a request for an advertisement to an advertiser associated with the one or more of the plurality of advertiser intents;

receive the advertisement from the advertiser associated with the one or more of the plurality of advertiser intents; and display the advertisement received from the advertiser to the user.

35. The system of claim 34, wherein, the user information associated with the user comprises a search engine query of the user.

36. The system of claim 35, wherein the or more processors are further operable to:

parse the search engine query submitted by the user to determine a presence of one or more sets of words; and derive the one or more user intents based on the one or more sets of words in the search engine query.

37. The method of claim 36, wherein:

when determining that the user information is accepted, the one or more processors are operable to determine that every one of the one or more sets of words in the search engine query matches at least one of the plurality of advertiser intents.

38. The system of claim 34, wherein the user information comprises one or more present online activities of the user and the one or more processors are further operable to determine the one or more user features based on the one or more present online activities of the user.

39. The system of claim 34, wherein, when determining that the user information is accepted, the one or more processors are further operable to determine that the one or more user intents match the one or more of the plurality of advertiser intents.

40. The system of claim 34, wherein, when determining that the user information is accepted, the one or more processors are further operable to determine that every one of the one or more user intents matches at least one of the plurality of advertiser intents.

41. The system of claim 34, wherein when determining that the user information is accepted, the one or more processors are further operable to:

determine that at least one of the one or more user intents matches at least one of a first specified subset of the plurality of advertiser intents; and determine that every one of the one or more user intents does not match any one of a second specified subset of the plurality of advertiser intents.

42. The system of claim 34, wherein the one or more processors are further operable to:

derive a plurality of keywords from the plurality of advertiser intents, and determine that one or more of the plurality of keywords matches with the one or more user intents when determining that the user information is accepted.

43. The system of claim 34, wherein the one or more processors are further operable to:

receive one or more bids for the search engine query, each bid of the one or more bids comprising a maximum payment amount that an advertiser placing the bid agrees to pay if the bid is selected.

44. The system of claim 43, wherein the bid further comprises the advertisement.

45. The method of claim 1, wherein:

generating the personalized Internet advertisement comprises:

selecting an advertisement template based at least in part on the one or more user intents; and customizing the advertisement template based at least in part on the one or more user intents.

46. The system of claim 23, wherein:

the one or more processors coupled to the memory and operable to execute the instructions to generate the advertisement comprises generating the advertisement by:

selecting an advertisement template based at least in part on the one or more user intents; and customizing the advertisement template based at least in part on the one or more user intents.

* * * * *